United States Patent
Küpper

(10) Patent No.: US 10,496,054 B2
(45) Date of Patent: Dec. 3, 2019

(54) METHOD FOR CONTROLLING TECHNICAL PROCESSES WITH LINEARIZATION

(71) Applicant: BAYER CROPSCIENCE AG, Monheim am Rhein (DE)

(72) Inventor: Achim Küpper, Leverkusen (DE)

(73) Assignee: BAYER CROPSCIENCE AG, Monheim am Rhein (DE)

( * ) Notice: Subject to any disclaimer, the term of this patent is extended or adjusted under 35 U.S.C. 154(b) by 33 days.

(21) Appl. No.: 15/574,774

(22) PCT Filed: Jun. 13, 2016

(86) PCT No.: PCT/EP2016/063511
§ 371 (c)(1),
(2) Date: Nov. 16, 2017

(87) PCT Pub. No.: WO2016/207012
PCT Pub. Date: Dec. 29, 2016

(65) Prior Publication Data
US 2018/0157223 A1    Jun. 7, 2018

(30) Foreign Application Priority Data
Jun. 26, 2015  (EP) .................................. 15174008

(51) Int. Cl.
*G05B 13/04*     (2006.01)
(52) U.S. Cl.
CPC ................................ *G05B 13/041* (2013.01)

(58) Field of Classification Search
None
See application file for complete search history.

(56) References Cited

U.S. PATENT DOCUMENTS 6,207,936 B1  3/2001  de Waard et al.
2017/0239719 A1* 8/2017  Buller ..................... B29C 64/40

* cited by examiner

*Primary Examiner* — Ziaul Karim
(74) *Attorney, Agent, or Firm* — Pauley Erickson & Kottis

(57) ABSTRACT

A method for controlling a technical process with a controller that generates a correcting variable, where a controlled variable approximately constitutes or forms a step function as a function of the correcting variable, in which in a first section of a value range of the correcting variable, the controlled variable forms a first plateau with values that are virtually the same, in a second section of the value range of the correcting variable, the controlled variable has a steep transition from the first plateau to a second plateau with values that are likewise virtually the same, and in a third section of the value range of the correcting variable, the controlled variable forms the second plateau. According to this invention, the step function is approximated by an approximation function in the form of a sigmoid function. An inverse function is produced for the approximation function. The controlled variable and a reference variable that constitutes a set point for the controlled variable are transformed by the inverse function into an auxiliary controlled variable. The auxiliary reference variable and auxiliary reference variable serve the controller as a basis for the determination of the correcting variable.

14 Claims, 6 Drawing Sheets a b c a b c

METHOD FOR CONTROLLING TECHNICAL PROCESSES WITH LINEARIZATION

BACKGROUND OF THE INVENTION

Field of the Invention

This invention relates to a method for controlling a technical process with a controller that generates a correcting variable, where a controlled variable approximately forms a step function as a function of the correcting variable.

Discussion of Related Art

In the temperature control of a distillation column, there is an extremely nonlinear influence between the temperature in the column, which is to be controlled as a controlled variable, and the correcting variable in the form of a steam flow that is used to supply thermal energy to an evaporator of the column. The dependency of the temperature to be controlled on the steam flow can be described as in a first section of the value range for the steam flow, the temperature is at a first plateau in which the values differ from one another hardly at all. This section corresponds to a part of the temperature profile across the height of the column in which an extrapure substance or a constant material composition is present. In a second or middle section of the value range of the steam flow, there is a steep transition in the form of a significant temperature increase from the first level to the second level. This section corresponds to the middle part of the temperature profile across the height of the column, in which a mixture of extrapure substances is present. In a third section of the value range of the steam flow, the temperature that is present at the second plateau once again changes hardly at all if the steam flow is once again increased in this value range. This section corresponds to a part of the temperature profile across the height of the column, in which a virtually extrapure substance or a constant material composition is already present.

This extremely nonlinear temperature profile has the property that a change in the steam flow has a different intensity of influence on the temperature as a function of the absolute magnitude of the applied steam flow. If the steam flow has low values, which lie in the first value range, then a change in the steam flow only yields very small temperature changes because in this case, the temperature is at the first, virtually constant level. The same is correspondingly true for high steam flows, which lie in the third section of the value range. Here, too, because of the second, virtually constant temperature level, it is only possible to change the temperature to any appreciable degree by large changes in the steam flow. Consequently, the controller must react in a comparatively intense way in these two temperature plateaus in order to maintain the set point and correct for disturbances in the process. But if the steam flow lies in the second section of the value range, even small changes in the steam flow yield large changes in the temperature. In this case, the controller must react in a correspondingly mild fashion.

The above-described extremely nonlinear dependency makes it difficult to control the temperature in a distillation column. In this case, disturbances such as pressure fluctuations in the steam network that supplies the steam flow can result in serious control problems, which in the past have resulted in shut-downs of the distillation column. The downtimes associated with this have a sometimes significant negative impact on the effective operation of the distillation column.

SUMMARY OF THE INVENTION

One object of this invention is to provide a simple control method for technical processes in which a controlled variable in the form of an above-described step function depends on the correcting variable, which method yields a robust, stable operation of the process.

The object underlying the invention is attained with the method according to exemplary embodiments discussed in this specification and in the claims.

According to this invention, the step function is approximated by a sigmoid function. The sigmoid function, also known as a gooseneck function or S function, is a mathematical function with an S-shaped graph. The sigmoid function is a limited and differentiable real function with a consistently positive or consistently negative first derivative and exactly one reversal point. The derivative therefore has an extremum at the reversal point of the function.

If for example the value range of the correcting variable is divided into three large sections so that the first section, the second section, and the third section are each of equal width and the controlled variable for this value range varies between 0% and 100%, then in one exemplary embodiment for the step function, the controlled variable should differ by no more than 15%, respectively, in the first section and in the second section. In the second range, there are thus values for the controlled variable that can differ by 70% or more. In another exemplary embodiment that is likewise divided into sections of equal width, the values for the controlled variable vary by at most 10%, respectively, in the first and second sections.

An inverse function $f^{-1}$ is produced for the sigmoid function f. The inverse function is a function that assigns each element of the target quantity its own uniquely defined original picture element. The inverse function is used to transform the controlled variable R into an auxiliary controlled variable $R_h$:

$$R_h = f^{-1}(R) \tag{1}$$

$R_h$ auxiliary controlled variable;
R controlled variable; and
$f^{-1}$ inverse function of the sigmoid function f.

The reference variable F, which can also be referred to as a set point for the controlled variable R that is to be controlled, is also transformed by the inverse function into an auxiliary reference variable $F_h$:

$$F_h = f^{-1}(F) \tag{2}$$

$F_h$ auxiliary reference variable; and
F reference variable.

The auxiliary controlled variable $R_h$ and auxiliary reference variable $F_h$ serve the controller as a basis for the generation of the correcting variable S. Generating the correcting variable S in this case also includes calculating or determining the correcting variable S. In one exemplary embodiment, the difference between the auxiliary reference variable $F_h$ and the auxiliary controlled variable $R_h$ is calculated. This difference is then supplied to the controller and this difference is used as a basis for calculating or determining the correcting variable S by the controller (e.g. PID, MPC).

In one exemplary embodiment, an arc tan function (arc tangent) is used for the sigmoid function. Preferably, it has the following form:

$$R = f_{arc\ tan}(S_R) = a + b * \arctan[(S-c)*d] \quad (3)$$

R controlled variable;
S correcting variable;
a first constant;
b second constant;
c third constant; and
d fourth constant.

The inverse function of the arc tan function is the tan function (tangent). Based on equations (1) and (3), it therefore follows that:

$$R_h = f^{-1}_{arctan}(R) = \frac{\tan\left[\frac{R-a}{b}\right]}{d} + c \quad (4)$$

Equation (4) can also be used for determining the auxiliary reference variable $F_h$ as a function of the reference variable F:

$$F_h = f^{-1}_{arctan}(F) = \frac{\tan\left[\frac{F-a}{b}\right]}{d} + c \quad (4b)$$

In both cases, it should be noted that the argument of the tan function must lie between $-0.57\pi$ and $0.57\pi$ in order to be able to uniquely calculate the auxiliary controlled variable $R_h$ and the auxiliary reference variable $F_h$, respectively, and, particularly by the conversion, to prevent jumps in the controlled variable that impact the correcting variable by the controller. Consequently, the controlled variable R should lie between:

$$-\frac{\pi}{2}b + a < R < +\frac{\pi}{2}b + a \quad (5)$$

and the reference variable F should lie between $$-\frac{\pi}{2}b + a < F < +\frac{\pi}{2}b + a. \quad (5b)$$

A controlled variable that lies outside these limits can be counteracted by a limit block and in the event of a violation, the controlled variable can be set to the limit.

A tan h function (hyperbolic tangent) can also be used as the sigmoid function. It can take the following form:

$$R = f_{tanh}(S) = a + b * \tanh[(S-c)*d] = a + b * \frac{e^{[2(S-c)*d]} - 1}{e^{[2(S-c)*d]} + 1}, \quad (6)$$

The inverse function for the tan h function is the arc tan h function (hyperbolic arc tangent). Based on equations (6) and (1), it therefore follows that:

$$R_h = \quad (7)$$

$$f^{-1}_{tanh}(R) = f_{arctanh}(R) = \frac{\operatorname{atanh}\left[\frac{R-a}{b}\right]}{d} + c = \frac{1}{2}\frac{1}{d}\ln\left(\frac{1 + \frac{R-a}{b}}{1 - \frac{R-a}{b}}\right) + c$$

Equation (7) can also be used for determining the auxiliary reference variable $F_h$ as a function of the reference variable F.

$$F_h = \quad (7b)$$

$$f^{-1}_{tanh}(F) = f_{arctanh}(F) = \frac{\operatorname{atanh}\left[\frac{F-a}{b}\right]}{d} + c = \frac{1}{2}\frac{1}{d}\ln\left(\frac{1 + \frac{F-a}{b}}{1 - \frac{F-a}{b}}\right) + c$$

In this case, it should be noted that the argument of the arc tan h function must lie between $-1$ and $1$ if equation (7) or equation (7b) is to yield a unique result. Consequently, the measured controlled variable R must lie between:

$$-b + a < R < +b + a \quad (8)$$

and the reference variable F must lie between $$-b + a < F < +b + a. \quad (8b)$$

If the controlled variable R lies outside these limits, as was already the situation in the case of the tan function above, then the controlled variable can be set to the limit value (limit block). This also applies analogously for the reference variable F.

A third sigmoid function is the function $$\frac{x}{\sqrt{1+x^2}} \quad (9)$$

This function is referred to as algebraic function aleq1. With regard to the technical presentation of the problem, it can assume the following form:

$$R = f_{aleq1}(S) = a + b * \frac{(S-c)*d}{\sqrt{1+((S-c)*d)^2}}. \quad (9b)$$

Based on equations (9b) and (1), it therefore follows that:

$$R_h = f^{-1}_{aleq1}(R) = \frac{1}{d} \frac{\left[\frac{R-a}{b}\right]}{\sqrt{1 - \left[\frac{R-a}{b}\right]^2}} + c \quad (9c)$$

The inverse function of equation (9b) can also be used for determining the auxiliary reference variable $F_h$ as a function of the reference variable F.

$$F_h = f^{-1}_{aleq1}(F) = \frac{1}{d} \frac{\left[\frac{F-a}{b}\right]}{\sqrt{1 - \left[\frac{F-a}{b}\right]^2}} + c, \quad (9d)$$

It should be noted that the argument R or F of algebraic function aleq1 must lie between $a-b$ and $a+b$ A fourth sigmoid function is the function $$\frac{x}{1+|x|} \qquad (10)$$

This function is referred to as algebraic function aleq2. With regard to the technical presentation of the problem, it can assume the following form:

$$R = f_{aleq2}(R_h) = a + b * \frac{(S-c)*d}{1+|(S-c)*d|}, \qquad (10b)$$

Based on equations (10b) and (1), it therefore follows that:

$$R_h = f_{aleq2}^{-1}(R) = \frac{1}{d} \frac{\left[\frac{R-a}{b}\right]}{1-\left|\frac{R-a}{b}\right|} + c \qquad (10c)$$

The inverse function of equation (10b) can also be used for determining the auxiliary reference variable $F_h$ as a function of the reference variable F.

$$F_h = f_{aleq2}^{-1}(F) = \frac{1}{d} \frac{\left[\frac{F-a}{b}\right]}{1-\left|\frac{F-a}{b}\right|} + c \qquad (10d)$$

It should be noted that the argument R or F of algebraic function aleq2 must lie between a−b and a+b.

In order to approximate the present step function by the sigmoid function, specific values must be determined for the individual constants. In this case, these values are determined so that the sigmoid function represents the best possible approximation of the step function of the technical process.

The step function itself can be based on measurement results. It can also be the result of a model, which is based, for example, on thermodynamic approaches.

Individual constants or parameters, which must be determined in the approximation by the sigmoid factors, can be roughly estimated, with the remaining constants or parameters then being calculated, for example, by a least squares optimization. The position of the reversal point can be estimated based on equation (3), in which the sigmoid function is represented by an arc tan function. The constants a and c are determined by this. The remaining constants b and d can then be calculated using the following equation:

$$\min_{b,d} \sum_{k=1}^{n} w_k \left(\frac{R_{prof,k} - R_k}{R_{prof,k}}\right)^2, \qquad (11)$$

s.t. $R_k = f_{arctan}(S_k)$, see equation (3)

$R_{prof,k}$ controlled variable according to the step function at location k;
$S_k$ correcting variable at location k;
$R_k$ controlled variable according to sigmoid function as a function of the correcting variable $S_k$; and
$w_k$ weighting factor.

The weighting factor $w_k$ preferably has a value equal to 1. It can be set to zero in order to be able to react to outliers when determining parameters. The outliers are thus not taken into account and do not pose an obstacle to achieving the best possible approximation by the sigmoid function.

Instead of the correcting variable S, in the method according to this invention, it is also possible to use a relative correcting variable $S_R$, which is preferably essentially proportional to the correcting variable S. This yields the following relation:

$$S_R = K \cdot S \qquad (12)$$

S correcting variable
$S_R$ relative correcting variable; and
proportionality constant.

Consequently, for example in equation (3), instead of the correcting variable S, the relative correcting variable $S_R$ is used through adaptation of the parameter d. Correspondingly, an approximation by the sigmoid function likewise yields a function in which the controlled variable R depends on the relative correcting variable $S_R$.

The constants a, b, c, and d can be determined on the basis of online measurements. Preferably, at least four sensors are used for this, which detect the controlled variable at different points of the value range of the correcting variable or the relative correcting variable. One of the four sensors should if possible detect the first plateau and another sensor should detect the second plateau. The two remaining sensors should be installed approximately in the transition region.

In the method according to this invention, preferably a PID controller is used for the controller. Another example for a suitable controller is an MPC controller (model predictive controller).

The method according to this invention can be used for the temperature control in a distillation column, by which a mixture that is to be separated is separated into at least one distillate or top product and a bottom product. In this case, the controlled variable that is to be controlled is a temperature T in the distillation column. This temperature is detected at a particular point or height in the distillation column. In this case, the reference variable is a set-point temperature, which is supposed to prevail at this point in the distillation column. For example, this can be a DMAC column, in which raw dimethylacetamide is purified through distillation. In this case, the top product is pure dimethylacetamide.

The correcting variable S can be a supply of energy or heat for an evaporator of the column, which is used to evaporate a mixture that is supplied to the column. For example, the heat can be supplied in the form of superheated steam from a steam supply network. The steam can be produced centrally in a heating plant or in a combined heat and power plant.

Another possible correcting variable S is the ratio between the distillate that is drawn off from the column and a reflux that is supplied back to the column in the form of a condensate. Another possible correcting variable S is the reflux flow. A more voluminous reflux in this case results in lower temperatures in the column.

If its use is provided, then the number of stages in the column can function as a relative correcting variable $S_R$. According to equation (3) and based on a temperature control in the column, this then reveals a dependency between the temperature to be controlled and the number of stages:

$$T = f_{arc\ tan}(\text{tray}) = a + b * \text{arc tan}[(\text{tray} - c) * d] \qquad (13)$$

T temperature; and tray the number of stages, corresponds to the relative correcting variable $S_R$.

The step function on which this function is based and which is to be approximated then likewise demonstrates the dependency of the temperature on the number of stages. It has turned out that the steam flow for heating the evaporator is very nearly proportional to the number of stages. Consequently, an increase in the steam flow by a certain amount results in a linear shift of the temperature profile (of the step function), for example by one stage.

Another example for the technical process that can be controlled with the method according to this invention is the neutralization of an acid with a base or the neutralization of a base with an acid. The controlled variable is the pH value, which is influenced through the continuous influx of acid and base. The step function to be approximated is a titration curve, which represents the pH value of the solution as a function of the percentage of acid or alkali. If powerful acids and bases are present, then as long as the salt error has only a slight influence, an equivalence point lies at pH=7 in the vicinity of which a small addition of acid or base yields a significant change in pH. The vicinity around the equivalence point therefore constitutes or forms the second region of the value range of the correcting variable in the step function, in which there is a steep transition between the virtually constant plateaus. The step function for the pH neutralization can be based on a titration curve, which is determined by system tests or through the use of a model, which, in order to calculate the pH value of the ion product of water, takes into account the electroneutrality, temperature influence, and salt error.

The controlled variable in the neutralization of the acid with the base is preferably the pH value. In a continuous neutralization process to which a constant flow of acid is supplied, the correcting variable can be the mass flow of base (for example, expressed in kg/h). With a constant mass flow of base, however, the mass flow of acid could be the value whose control yields the desired pH value. For example, it can be a system that is operated continuously to neutralize sodium hydroxide with hydrochloric acid. The product is water with a pH value of 8 and a high salt content.

The method according to this invention is used for technical processes that are characterized by an extremely non-linear behavior in the form of a step function between the correcting variable and the controlled variable. Based on the sigmoid function, which is used to approximate the step function, and with the aid of the inverse function of the sigmoid function, an auxiliary controlled variable for the controlled variable is generated, which is characterized by a virtually linear relationship with a slope of 1 between the correcting variable and the auxiliary controlled variable. In other words, according to this relationship, the correcting variable corresponds to the auxiliary controlled variable. If a relative correcting variable is used, then according to this relationship, the relative correcting variable corresponds to the auxiliary controlled variable.

Because the conversion between the controlled variable and the auxiliary controlled variable is uniquely defined, the controlled variable converges on the reference variable or set point when the auxiliary controlled variable converges on the auxiliary reference variable. Because this achieves a linearization of the process behavior, the process can be effectively controlled in a robust fashion by a linear controller (e.g. PID, MPC) in a simple control scheme.

The method can preferably be used for the two application examples described above. In the case of a temperature control of a distillation column, it is preferably the local position of the temperature profile across the height of a distillation column (relative correcting variable), which is shifted by varying the correcting variable along the height of the distillation column. The relationship between the correcting variable (steam flow to the evaporator or reflux ratio of the column) and the local position or the auxiliary controlled variable is (virtually) linear. In the case of a pH control of a neutralization process, it is the local position of the pH breakthrough curve that is dependent on the correcting variable (flow of acid or flow of base). The local position of the pH breakthrough curve in this case is linear relative to a ratio between the correcting variable (flow of acid/flow of base) and the disturbance variable (flow of base/flow of acid), which ratio is required for a particular pH value. Here, too, there is a linear relationship between the correcting variable and the ratio of mass flows.

BRIEF DESCRIPTION OF THE DRAWINGS

This invention is explained in greater detail in view of the figures. In the drawings.

DETAILED DESCRIPTION OF THE INVENTION

Figure 1:
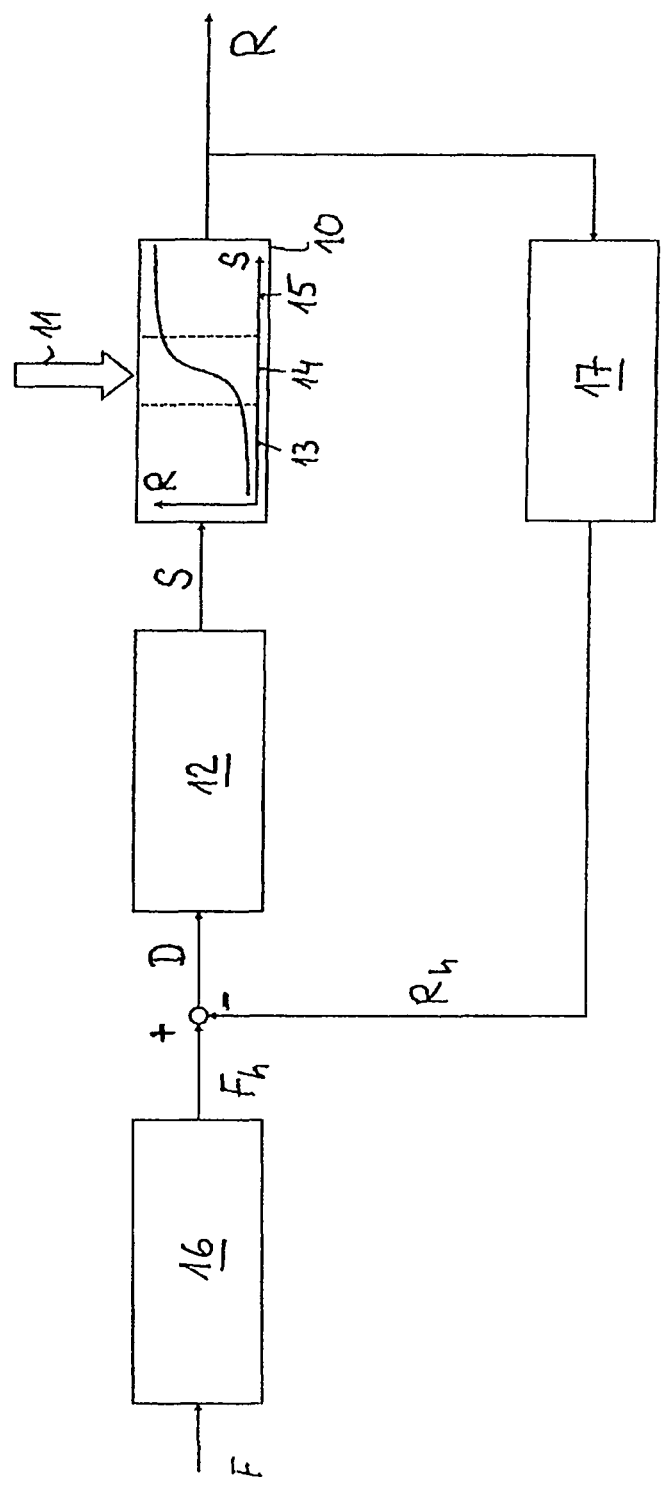
FIG. 1 shows a block circuit diagram of a control loop according to this invention.

FIG. 1 shows a control loop 1 for controlling a technical process. One object of this invention is to control a controlled variable R that is a result of the technical process. The technical process or also the so-called controlled system is represented by the block 10 in FIG. 1. Disturbance variables 11 act on the process 10, influencing the controlled variable R. One object of the control is to use a correcting variable S to influence the process so that the controlled variable R assumes a predetermined set point. This set point is usually referred to as the reference variable and is labeled F in FIG. 1. In block 10, a step function is shown, which is intended to indicate the basic dependency between the correcting variable S and the controlled variable R. The determination of the step function can be based on individual measurement values or can be a certain number of measured pairs of points. These measurement values can also be used in an online fashion in order to adapt the step function during ongoing operation of the system, see FIG. 1b. The step function, however, can also be the result of a (thermodynamic) simulation of the process 10, which can be calibrated or verified by individual measurement values.

In a first section 13 of the value range of the correcting variable S, the step function is virtually constant and constitutes a first plateau. The first section 13 is followed by a second section 14, which is characterized by a sharp change (in this case, a rise). This is followed by a third section 15, which does not contain any appreciable changes and is correspondingly characterized by a virtually constant second plateau. The second plateau in this case lies above the first plateau.

The determination/calculation and the generation of the correcting variable are carried out by a controller 12. The controller 12 should therefore also include systems in which a control quantity is calculated by a computer. In this case, the control quantity is conveyed to an actuator that generates the correcting variable or presets the correcting variable. In this case, therefore, the actuator would also have to be considered as part of the controller 12. The controller 12 determines/generates the correcting variable S based on a control deviation D. The control deviation D is calculated as the difference between an auxiliary reference variable $F_h$ and an auxiliary controlled variable $R_h$.

In block 16, the conversion from the reference variable F into the auxiliary reference variable $F_h$ is carried out using the inverted sigmoid function. This conversion used in block 16 is also taken as a basis in the conversion of the controlled variable R into the auxiliary controlled variable $R_h$ (see block 17).

According to this invention, the step function, which maps the technical process as a function of the variables R and S, is approximated by a sigmoid function. The derivative of the sigmoid function is always positive or negative and has exactly one local extremum. Correspondingly, the sigmoid function has exactly one reversal point.

Figure 1B:
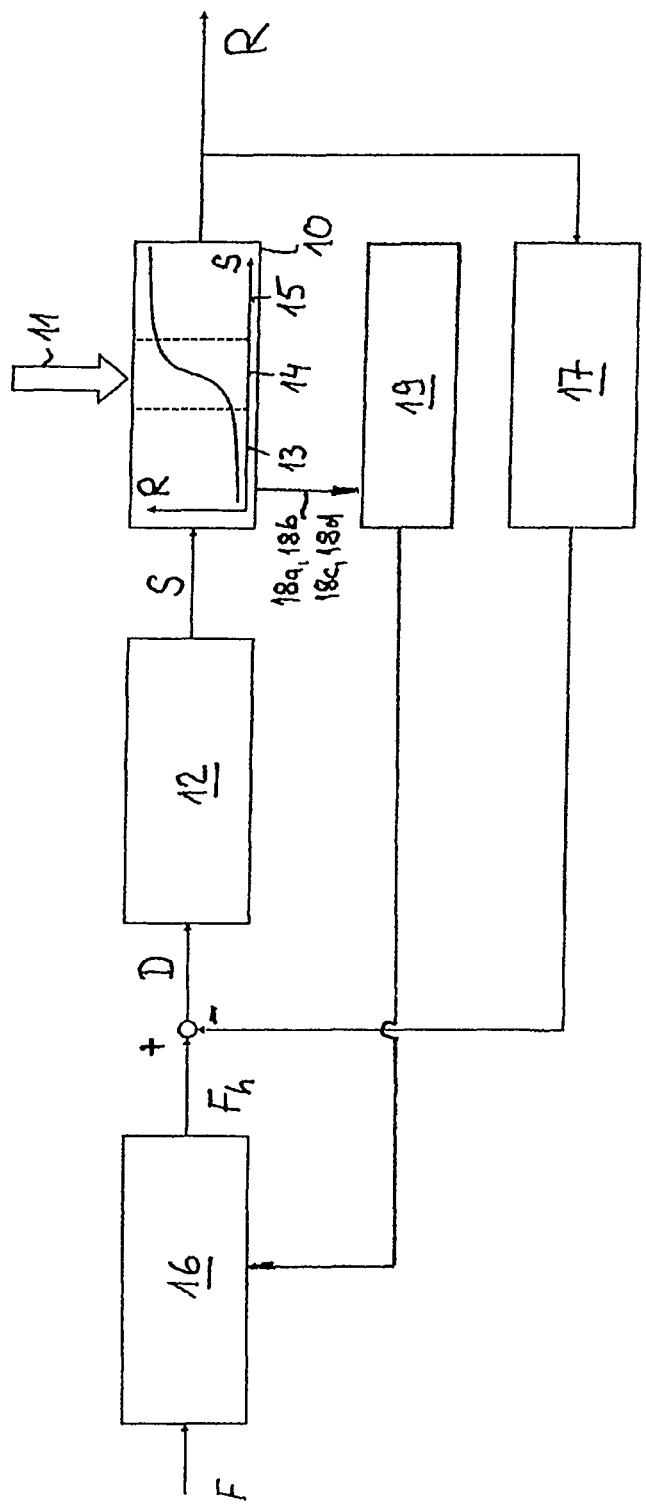
FIG. 1b shows the block circuit diagram from FIG. 1 with an enhancement.

FIG. 1b shows a control loop 1, which is enhanced relative to the control loop in FIG. 1 through the addition of a block 19 for an online estimation of the step function. The online estimation is carried out based on measurements in the system, which detect the curve of the step function based on the local process variable. The estimation of the step function is carried out based on the measurements 18a, 18b, 18c, and 18d and based on equation (11). The conversion of the reference variable F into the auxiliary reference variable $F_h$ (block 16) and the conversion of the controlled variable R into the auxiliary controlled variable $R_h$ (block 17) are carried out based on the inverted step function.

Figure 2:
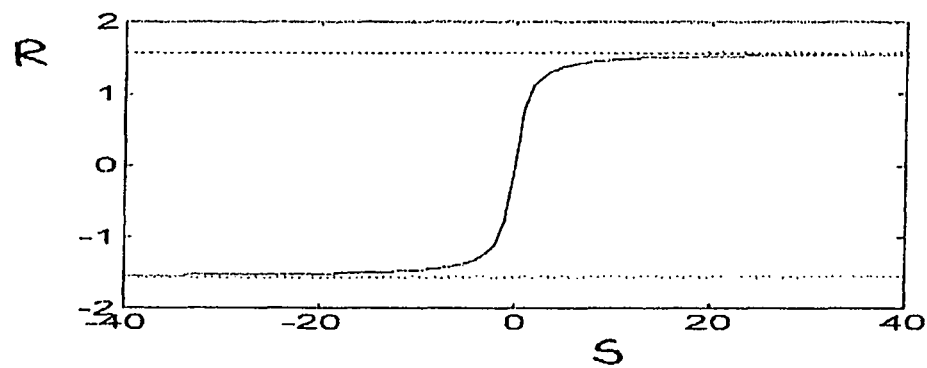
FIG. 2 shows a sigmoid function for a controlled variable, a corresponding inverse function for the auxiliary controlled variable, and the resulting function of the auxiliary controlled variable as a function of the correcting variable.
Figure 2:
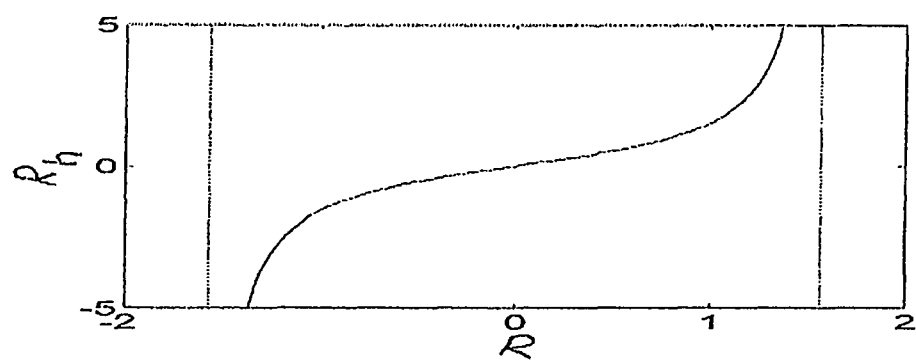
Figure 2:
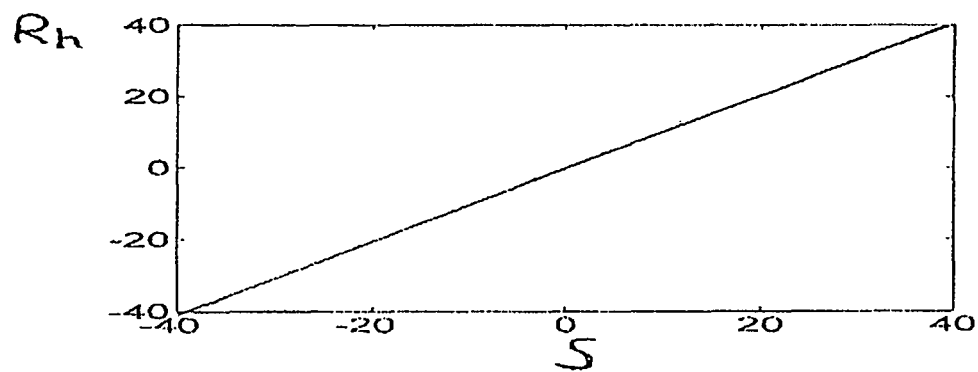

An arc tan function $R=f_{arc\ tan}(S)$ is shown in FIG. 2 (see FIG. 2a) as an example of the sigmoid function. The reversal point of the arc tan function is at S=0. At low values of S, the arc tan function approaches $-0.57\pi$. At high values of S, the arc tan function approaches $0.57\pi$.

The inverse function is determined for the sigmoid function. In the case of the arc tan function according to FIG. 2a, this is a tan function. The inverse function is used to convert the controlled variable R into the auxiliary controlled variable $R_h$. This analogously also applies to the reference variable F. It is converted into the auxiliary reference variable $F_h$.

FIG. 2c shows the dependency of the auxiliary controlled variable $R_h$ on the correcting variable S. Because of the inverse function, the extremely nonlinear dependency between the controlled variable R and the correcting variable S according to the sigmoid function, which the step function approximates, is converted into a linear dependency between the auxiliary controlled variable $R_h$ and the correcting variable S. The slope is 1 here.

Figure 3:
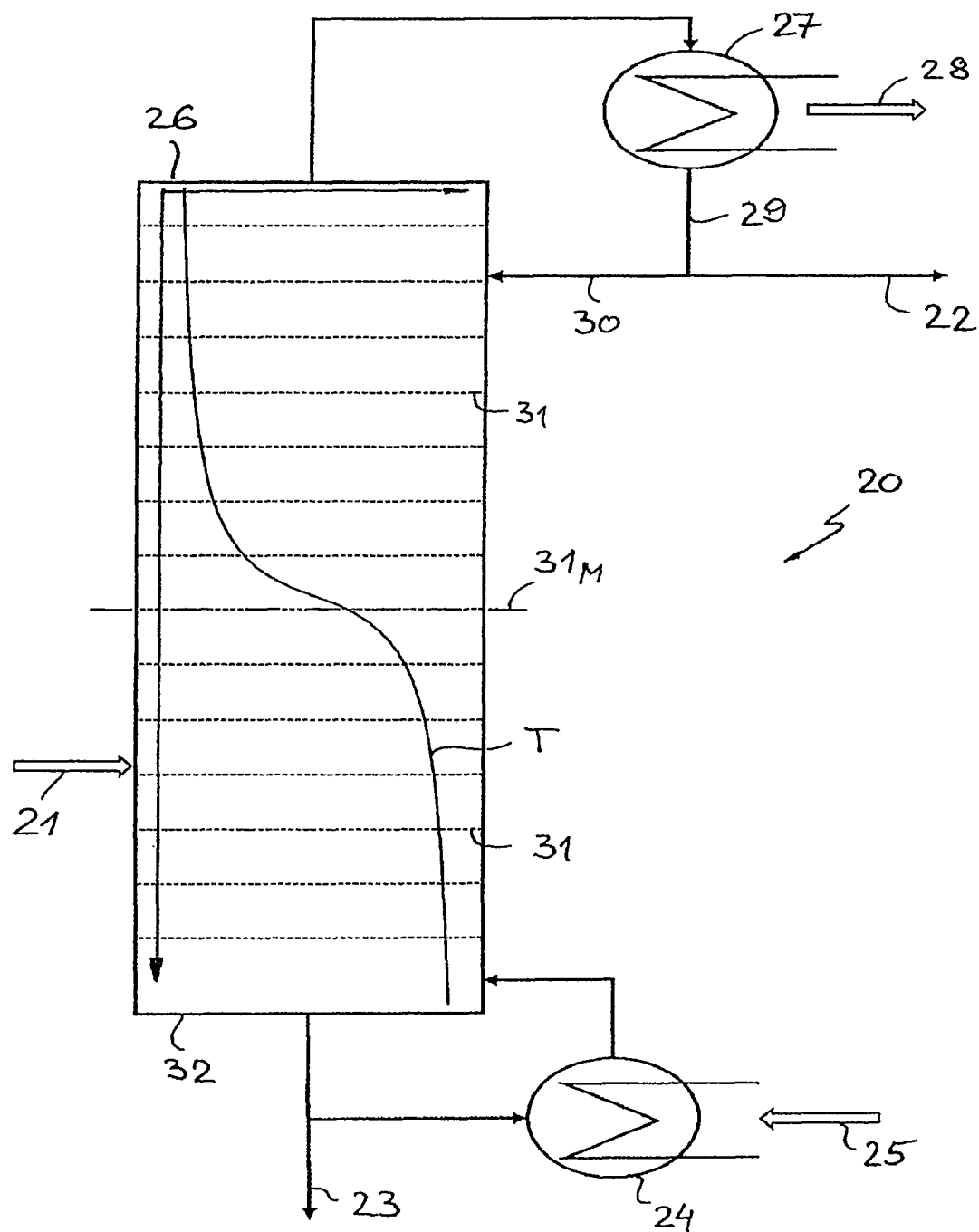
FIG. 3 schematically shows a distillation column with a temperature curve.

FIG. 3 schematically shows a distillation column 20. The distillation column 20 is used for separating a continuously supplied mixture 21 into a top product 22 and a bottom product 23. To achieve this, the liquid mixture 21 is heated in an evaporator 24 so that it evaporates. The heat required for the evaporator is provided by a steam flow 25. At the upper end of the distillation column, such as at a head 26 of the distillation column, the top product 22 is drawn off and then condensed in a condenser 27. The heat extracted from the process is labeled with the reference numeral 28. A product flow 29 coming from the condenser 27, however, is only partially drawn off (see top product 22). Another part, a reflux 30, is conveyed back into the column 20.

FIG. 3 also shows the profile of a temperature T that develops in the distillation column as a function of the height or as a function of the number of stages of the distillation column. The individual stages of the column are indicated with dashed lines and labeled with the reference numeral 31. One stage is labeled with the reference numeral $31_M$. This is intended as the stage in which the temperature in the measurement column is measured for purposes of temperature control.

It is clear that in the region of the head 26, lower temperatures develop than in the region of a bottom 32. The profile of the temperature constitutes or forms the above-mentioned step function with its different sections, as described above in connection with FIG. 1. With an increasing number of stages (counting from the head 26), the temperature increases in an S-shaped fashion toward the bottom 32.

By reducing the steam flow 25, it is possible to shift the profile of the temperature 26 toward the bottom 32. If the steam flow 25 is instead increased, the temperature profile is shifted toward the head 26 while essentially maintaining a good approximation of its basic shape. It has turned out that a good approximation of a linear relationship exists between the number of stages and the steam flow. Consequently, the number of stages can be used as a relative correcting variable.

Figure 4:
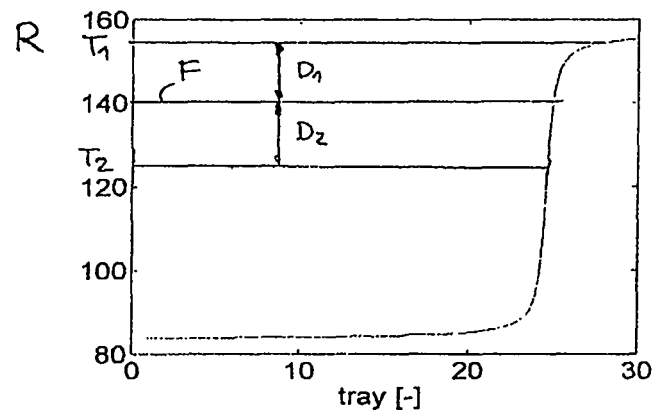
FIG. 4 shows a sigmoid function for temperature that is to be controlled in a distillation column, a corresponding inverse function, and the relationship between the auxiliary controlled variable and a number of stages of the column.
Figure 4:
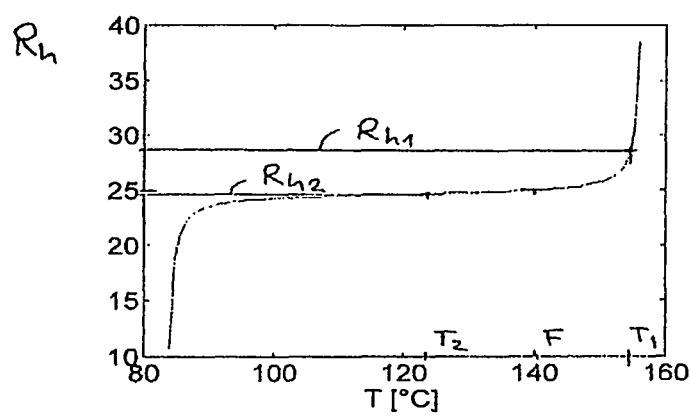
Figure 4:
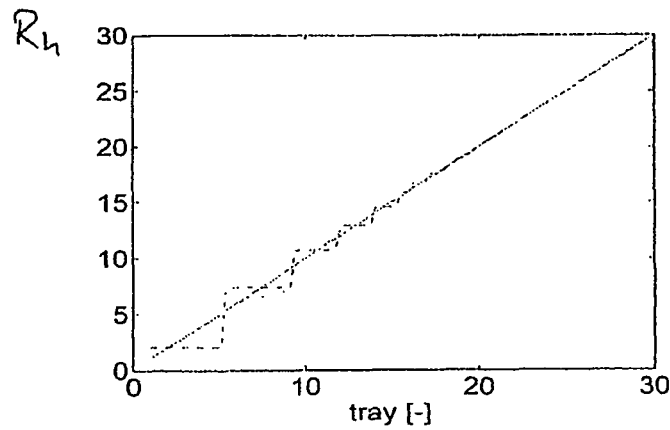

FIG. 4a shows an arc tan function for an exemplary embodiment, with determined values for the constants a, b, c, and d. This arc tan function is a good approximation of the step function in the distillation column 20, obtained through a thermodynamic modeling, as a function of the number of stages tray:

$$T=f_{arc\ tan}(\text{tray})=120+23.25*\text{arc tan}[(\text{tray}-24.6)*3.22] \quad (14)$$

Small numbers of stages result in a temperature of approximately 84° according to equation (14). This corresponds to the temperature of the first or lower plateau of the approximated step function. According to equation (14), large numbers of stages result in a temperature of approximately 156° degrees, which replicates the upper plateau. The position of the reversal point of the arc tan function is determined by the number of stages, which equals 24.3, and the temperature, which equals 120° degrees.

With a control deviation D, the controller 12, which is preferably embodied as a PID controller, determines a new number of stages, which can then be converted into a new steam flow based on the known proportionality. As a result, the temperature profile in the column 20 is shifted correspondingly so that the difference between the actual temperature in stage $31_M$ and the set-point temperature for this stage becomes smaller and ideally, becomes zero. The controller, however, is not fed with the variables R and F, but rather with the respective auxiliary variables $R_h$ and $F_n$. The control deviation D thus corresponds to the auxiliary reference variable $F_h$ minus the auxiliary controlled variable $R_h$.

According to FIG. 4a, for example, the reference variable F or the set-point variable for the temperature T to be controlled should be 140° degrees. Furthermore, two temperatures $T_1$ and $T_2$ are plotted in FIG. 4a. The temperatures $T_1$ and $T_2$ each like approximately 15° degrees from the reference variable F. This therefore yields two deviations $\Delta_1$ and $\Delta_2$ with the same absolute value, namely $\Delta_1=-15°$ on the one hand and $\Delta_2=15°$ degrees on the other.

If the temperature $T_1$ is present, then the auxiliary controlled variable $R_{h1}$ is calculated based on the inverse function of the arc tan function shown in FIG. 4a. This yields a value for $R_{h1}$ of approximately 29. The auxiliary reference variable $F_h$ in this case is approximately 25. This yields a difference of 4, which according to this invention, as control deviation D, is taken as a basis for calculating the relative correcting variable. According to FIG. 4c, the corresponding relative correcting variable is likewise 4, which can then be converted into the new steam flow quantity or into a change in the steam flow quantity, taking into account the proportionality constant in equation (12).

But if the temperature $T_2$ is present, then this results in a control deviation of only approximately 0.5 for the controller. In this case as well, the auxiliary reference variable $F_h$ is also approximately 25 and the auxiliary controlled variable $R_{h2}$ is approximately 24.5. The change to be made in the steam flow is then also correspondingly small. Although the temperature deviations of $T_1$ and $T_2$ are equal to each other at the reference variable T=140° degrees, the method according to this invention results in significantly different reactions of the controller 12. If the reference variable and controlled variable lie in the vicinity of the reversal point of the approximation function, then only small changes in the steam flow are required in order to raise or lower the temperature. The control therefore reacts very gently. With large distances from the reversal point, however, the control reacts much more intensely. The method according to this invention, however, permits access to a controller with the same control behavior.

Because the inverse function has steep slopes at the edges of its value range of R, as can be inferred from the drawings in FIGS. 2b and 4b, a potential measurement error of the sensor that detects the controlled variable R flows with a correspondingly large factor into the auxiliary controlled variable $R_h$. With a finite sensor precision, this yields a step function whose individual steps at the edges of the value range produce considerable deviations from the linear dependency shown in FIGS. 2c and 4c. Such a step function is indicated in FIG. 4c.

Since the arc tan function (normalized with the factor $2/\pi$) and the aleq2 function have flatter curves than the tan h function and the aleq1 function, the inverse function of the arc tan function and the aleq1 function, respectively, amplifies the measurement values more strongly. This results in the fact that a temperature band of the step function is converted by the inverted sigmoid function into a larger (linear) band of the auxiliary controlled variable. This larger band is advantageous for a control because it results in earlier detection by the controller that the process, which is in one section of the step function, is approaching another section of the step function. This is important particularly for a finite measurement precision of the sensor, which in turn limits the band of the auxiliary controlled variable. As compared to the sigmoid function according to equation ( ), the sigmoid function according to equation (10) has comparable advantages with regard to the limitation of the band of the controlled variable due to measurement error.

Figure 5:
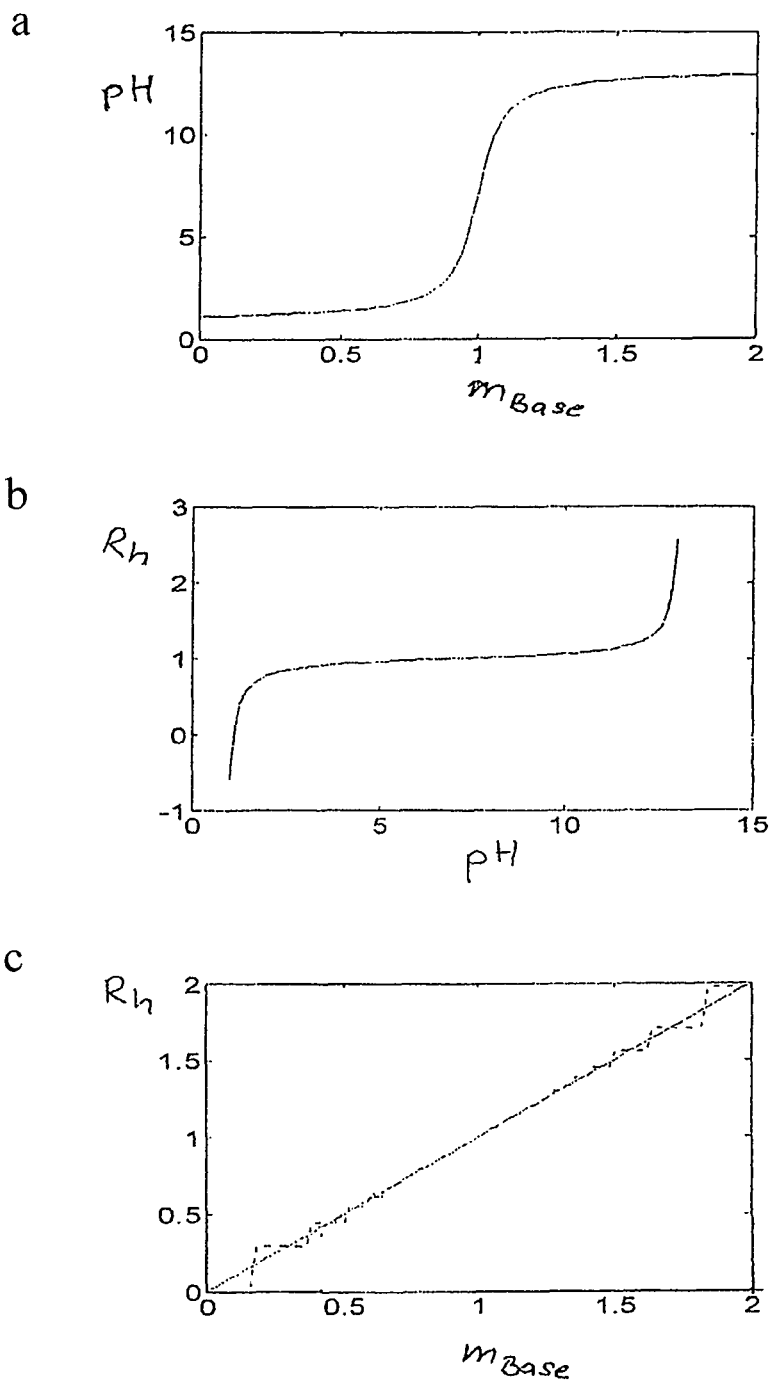
FIG. 5 shows a sigmoid function for a pH value of an acid/base mixture that is to be controlled, a corresponding inverse function, and the relationship between the auxiliary controlled variable and a mass flow of base.

FIGS. 5a to 5c show the approximation function for a titration curve of an acid/base mixture (FIG. 5a), the associated inverse function (FIG. 5b), and the linearized relationship between the auxiliary reference variable $R_h$ in the form of the pH value of the mixture and the correcting variable S in the form of a flow of base (FIG. 5c). Here, too, an arc tan function according to equation (6) has been selected as an approximation function. In this case as well, the titration curve is approximated by determining the constants a, b, c, and d. This yields the following equation:

$$pH=f_{arc\ tan}(m_{Base})=7+3.923*\text{arc tan}[(m_B-1)*15.284] \quad (15)$$

pH pH value of the acid/base mixture; and
$m_{Base}$ flow of base in kg/h.

The reversal point of the function according to the equation (15) lies at a flow of base of mBase=1 [kg/h] and pH=7. The value range for the function values of the arc tan function extends between pH=0.8 and 13.2. With the inverse function, the extremely nonlinear relationship between the pH value and the flow of base is reduced to a linear dependency, which makes it possible, through the use of a conventional PID controller, to control the relationship between the pH value and the flow of base in a stable and reliable fashion. As is also shown in FIG. 5c, a finite sensor precision at the edges of the value range of the flow of base yields a step function, which differs markedly from a straight line.

The invention claimed is:

1. A method for controlling a technical process with a controller (12) that generates a correcting variable (S), where a controlled variable (R) constitutes a step function as a function of the correcting variable (S), wherein:

the technical process is distillation in a distillation column (20), the controlled variable (R) is a temperature, and the correcting variable (S) is a supply of energy into the column (20), a reflux flow (30), or a ratio between a distillate (22) from the column (20) and the reflux flow (30);

in a first section (13) of a value range of the correcting variable (S), the controlled variable (R) forms a first plateau with values, determined by a sensor connected to the controller, that are virtually the same;

in a second section (14) of the value range of the correcting variable (S), the controlled variable (R) has a steep transition, determined by the sensor or a second sensor connected to the controller, from the first plateau to a second plateau with values that are virtually the same; and in a third section (15) of the value range of the correcting variable (S), the controlled variable (R) forms the second plateau determined by the sensor or a third sensor connected to the controller, the method including:

a) the step function is determined by an approximation function (f) in the form of a sigmoid function;
b) an inverse function ($f^{-1}$) produced for the approximation function;
c) the controlled variable (R) and a reference variable (F) that constitutes a set point for the controlled variable (R) are transformed by the inverse function into an auxiliary controlled variable ($R_h$) and an auxiliary reference variable ($F_h$); and
d) the auxiliary controlled variable ($R_h$) and auxiliary reference variable ($F_h$) serve the controller as a basis for a determination of the correcting variable (S).

2. The method according to claim 1, wherein the sigmoid function is an arctangent (arc tang) function, a hyperbolic tangent (tan h) function, an algebraic function:

$$F_h = f_{aleq1}^{-1}(F) = \frac{1}{d}\frac{\left[\frac{F-a}{b}\right]}{\sqrt{1-\left[\frac{F-a}{b}\right]^2}} + c, \quad \text{(aleq1)}$$

or an algebraic function:

$$F_h = f_{aleq2}^{-1}(F) = \frac{1}{d}\frac{\left[\frac{F-a}{b}\right]}{1-\left|\frac{F-a}{b}\right|} + c \quad \text{(aleq2)}$$

$F_h$ auxiliary reference variable;
F reference variable;
a first constant;
b second constant;
c third constant; and
d fourth constant.

3. The method according to claim 2, wherein the arc tan function has a form:

$$R = f_{arc\ tan}(S) = a + b * \arctan[(S-c)*d]$$

R controlled variable;
S correcting variable;
a first constant;
b second constant;
c third constant; and
d fourth constant.

4. The method according to claim 3, wherein the second constant (b) and fourth constant (d) are determined by a least squares optimization.

5. The method according to claim 2, wherein the tan h function has a form:

$$R = f_{tanh}(S) = a + b*\tanh[(S-c)*d] = a + b*\frac{e^{[2(S-c)*d]}-1}{e^{[2(S-c)*d]}+1}$$

R controlled variable;
S correcting variable;
a first constant;
b second constant;
c third constant; and
d fourth constant.

6. The method according to claim 5, wherein in the approximation, the step function is selected, which depends on a relative correcting variable $S_R$ that is essentially proportional to the correcting variable S.

7. The method according to claim 6, wherein the second constant (b) and fourth constant (d) are determined by a least squares optimization.

8. The method according to claim 7, wherein during the process, the constants (a, b, c, and d), at least the second constant (b), and the fourth constant (d), are determined based on online measurements.

9. The method according to claim 8, wherein a PID controller or an MPC controller is used as the controller (12).

10. The method according to claim 7, wherein during the process, the constants (a, b, c, and d), at least the second constant (b), and the fourth constant (d), are determined based on online measurements.

11. The method according to claim 1, wherein in the approximation, the step function is selected, which depends on a relative correcting variable $S_R$ that is essentially proportional to the correcting variable S.

12. The method according to claim 1, wherein a PID controller or an MPC controller is used as the controller (12).

13. The method according to claim 1, wherein the relative correcting variable ($S_R$) is a number of stages of the column (20).

14. A method for controlling a technical process, the method comprising a controller (12) generating a correcting variable (S) from a controlled variable (R) constituting a step function as a function of the correcting variable (S), the controller comprising at least one sensor sensing along the technical process, wherein the technical process is distillation in a distillation column (20), the controlled variable (R) is a temperature, and the correcting variable (S) is a supply of energy into the column (20), a reflux flow (30), or a ratio between a distillate (22) from the column (20) and the reflux flow (30), and further comprising:
  determining with a first sensor a first section (13) of a value range of the correcting variable (S), wherein in the first section (13) the controlled variable (R) forms a first plateau with values that are virtually the same;
  determining with the first sensor or a second sensor a second section (14) of the value range of the correcting variable (S), wherein in the second section (14) the controlled variable (R) has a steep transition from the first plateau to a second plateau with values that are virtually the same;
  determining with the first sensor or a third sensor a third section (15) of the value range of the correcting variable (S), wherein in the third section (15) the controlled variable (R) forms the second plateau;
  determining the step function by an approximation function (f) in the form of a sigmoid function;
  producing an inverse function ($f^{-1}$) for the approximation function;
  transforming the controlled variable (R) and a reference variable (F) that constitutes a set point for the controlled variable (R) by the inverse function into an auxiliary controlled variable ($R_h$) and an auxiliary reference variable ($F_h$); and
  the controller determining the correcting variable (S) from the auxiliary controlled variable ($R_h$) and auxiliary reference variable ($F_h$).

* * * * *